United States Patent Office 2,962,358
Patented Nov. 29, 1960

2,962,358

METHOD OF MAKING LITHIUM PEROXIDE IN METHANOL

Henry H. Strater, Mayfield Heights, Ohio, assignor to Barium & Chemicals, Willoughby, Ohio, a corporation of Ohio No Drawing. Filed June 2, 1958, Ser. No. 738,959

4 Claims. (Cl. 23—184)

The present invention relates to a method of preparing lithium peroxide, and particularly relates to the preparation of such material in an alcohol reacting medium.

Heretofore there have been some methods proposed for the production of lithium peroxide, but none of such methods have been completely satisfactory for low cost effective production of lithium peroxide, so far as I am aware. More uses are being found for lithium peroxide as an oxygen source because it is a low weight solid and need exists for a relatively uncomplicated method by which the desirable quantities of lithium peroxide can be economically and safely secured.

The general object of the present invention is to provide a novel and improved method of producing lithium peroxide by the oxidation of a solution of anhydrous lithium hydroxide in an alcohol by use of hydrogen peroxide as an oxidizing agent.

Another object of the invention is to provide a safe, easily practiced process for obtaining an end product having a high percentage of lithium peroxide content.

Another object of the invention is to utilize the insolubility of lithium peroxide in alcohol to facilitate the formation of commercial percentages of lithium peroxide in a reversible chemical reaction.

The foregoing and other objects and advantages of the invention will be made more apparent as the specification proceeds.

The present invention, in general, relates to the production of lithium peroxide by dissolving anhydrous lithium hydroxide in an alcohol solution until the solution is saturated, filtering off any insoluble materials, such as carbonates present in the solution, adding hydrogen peroxide solution slowly to the lithium hydroxide solution and stirring the mixture, during which time the lithium peroxide is produced as a precipitate, and thereafter filtering the mixed solutions to recover the lithium peroxide end product.

*Example*

One example of the process of the invention comprised the dissolving of 500 grams of anhydrous lithium hydroxide in 7500 cc. of commercial 95% methanol. The solution was then filtered to remove insoluble lithium carbonate and other insoluble materials present. Approximately 3000 cc. of 27.5% hydrogen peroxide was slowly added over a period of about 10 minutes to the lithium hydroxide solution while the mixture was stirred. Then the mixture was permitted to react for approximately thirty minutes and occasionally stirred during such reaction time. A precipitate of lithium peroxide was produced and the reaction mixture was filtered to obtain the lithium peroxide. Such end product was washed twice with 100 cc. portions of commercial 95% menthanol. The product was dried in a vacuum of 29" at between 90 to 100° C. and 380 grams of 96.0% lithium peroxide were recovered.

In the practice of this process, the strength of the hydrogen peroxide used can be changed and with the higher percentage solutions of such peroxide, a greater percent recovery of the theoretical amount of lithium peroxide available can be obtained.

The drying may be done under atmospheric pressure at suitable temperatures to keep decomposition of the lithium peroxide at a minimum.

Ethyl alcohol can be used, as well as methanol, and commercial strength alcohols are satisfactory. The reaction of the invention will occur at room temperature.

Should it be desired to recover the lithium present in the end filtrate material, the filtrate can be heated to distill the alcohol therein which can be recovered for further use. The water present also is evaporated off and the residue material will have been partially converted from lithium peroxide over to lithium hydroxide. Such end product can be purified in any conventional manner and be again used in the practice of the process, or it can be used for other purposes, as desired.

The reaction conditions are readily controllable by the process described, as the hydrogen peroxide is slowly added to the reacting materials and no excessive temperatures would be produced. The reacting materials can be cooled in any conventional manner, if desired.

The process of the invention can be readily practiced and the end product, lithium peroxide, is ready for use for any desired purpose. It thus can be used as a solid fuel, as for a rocket, or it is possible to use the lithium peroxide as a source of oxygen for other purposes.

From the foregoing description, it will be seen that the invention has provided an easily practiced safe process for producing lithium peroxide so that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. A method of preparing lithium peroxide consisting of the steps of dissolving sufficient anhydrous lithium hydroxide in methyl alcohol to saturate the solution, said anhydrous lithium hydroxide containing lithium carbonate as an impurity and which impurity is insoluble in methyl alcohol, filtering off any insoluble materials including the lithium carbonate, adding hydrogen peroxide solution slowly to the lithium hydroxide solution and stirring the mixed solutions, permitting the mixed solutions to react at the ambient temperature, lithium peroxide being produced as a precipitate, filtering the mixed solutions to remove the lithium peroxide therefrom, washing the lithium peroxide with methyl alcohol and drying the washed lithium peroxide under vacuum.

2. A method as in claim 1 wherein the filtrate after removal of the precipitated lithium peroxide still contains lithium peroxide in solution, the additional steps of heating the solution to distill the alcohol therefrom and to form lithium hydroxide from the lithium peroxide, and recovering such lithium hydroxide for further processing.

3. A method of preparing lithium peroxide consisting of the steps of dissolving sufficient anhydrous lithium hydroxide in an alcohol from the class consisting of methanol and ethanol to saturate the solution, filtering off any insoluble materials, adding hydrogen peroxide slowly over an interval of several minutes to the lithium hydroxide solution while stirring, lithium peroxide being produced as a precipitate in the reaction mixture, filtering the solution to remove the lithium peroxide therefrom, washing the lithium peroxide with the solution alcohol, and drying the washed lithium peroxide.

4. A method of preparing lithium peroxide from materials in the proportions indicated and consisting of the steps of dissolving about 500 grams of anhydrous lithium hydroxide in about 7500 cc. of methyl alcohol to saturate the solution, filtering off any insoluble materials, adding about 3000 cc. of a 27.5% hydrogen peroxide solution slowly to the lithium hydroxide solution while stirring, letting the mixed solutions stand and react for about 30 minutes, lithium peroxide being produced as a precipitate, filtering the reaction solution to remove the lithium peroxide therefrom, and drying the lithium peroxide.

References Cited in the file of this patent

UNITED STATES PATENTS

| | | |
|---|---|---|
| 2,215,856 | Pfleiderer | Sept. 24, 1940 |
| 2,488,485 | Winternitz | Nov. 15, 1949 |